(12) United States Patent
Sakaguchi

(10) Patent No.: US 9,210,407 B2
(45) Date of Patent: Dec. 8, 2015

(54) IMAGE PROCESSING APPARATUS AND METHOD, AND PROGRAM

(75) Inventor: Tatsumi Sakaguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 516 days.

(21) Appl. No.: 13/386,157

(22) PCT Filed: May 20, 2011

(86) PCT No.: PCT/JP2011/002839
§ 371 (c)(1),
(2), (4) Date: Jan. 20, 2012

(87) PCT Pub. No.: WO2011/148606
PCT Pub. Date: Dec. 1, 2011

(65) Prior Publication Data
US 2012/0194514 A1    Aug. 2, 2012

(30) Foreign Application Priority Data

May 28, 2010    (JP) ................ P2010-122725

(51) Int. Cl.
| | |
|---|---|
| *G06T 15/04* | (2011.01) |
| *H04N 13/02* | (2006.01) |
| *H04N 13/00* | (2006.01) |
| *H04N 13/04* | (2006.01) |

(52) U.S. Cl.
CPC ....... *H04N 13/0282* (2013.01); *H04N 13/0011* (2013.01); *H04N 13/0445* (2013.01); *H04N 13/0484* (2013.01)

(58) Field of Classification Search
USPC ................. 345/419, 421, 422, 427
See application file for complete search history.

(56) References Cited

U.S. PATENT DOCUMENTS

| | | | | |
|---|---|---|---|---|
| 7,239,293 | B2 * | 7/2007 | Perlin et al. ................. | 345/7 |
| 7,557,824 | B2 * | 7/2009 | Holliman .................. | 348/46 |
| 7,873,207 | B2 * | 1/2011 | Tsubaki .................. | 382/154 |
| 7,983,477 | B2 * | 7/2011 | Holliman ................ | 382/154 |
| 8,000,521 | B2 * | 8/2011 | Kira ........................ | 382/154 |
| 8,373,745 | B2 * | 2/2013 | Masuda et al. ............ | 348/46 |
| 2005/0190180 | A1 * | 9/2005 | Jin et al. ................... | 345/419 |
| 2007/0052794 | A1 * | 3/2007 | Ha et al. ................... | 348/42 |

(Continued)

FOREIGN PATENT DOCUMENTS

| | | |
|---|---|---|
| JP | 2006-229725 | 8/2006 |
| JP | 2008-21210 | 1/2008 |

(Continued)

*Primary Examiner* — Kimbinh T Nguyen
(74) *Attorney, Agent, or Firm* — Hazuki International, LLC

(57) ABSTRACT

An apparatus for processing source images having known viewpoints is disclosed. The apparatus may include a viewpoint determining section for determining, relative to the known viewpoints, left-eye and right-eye viewpoints of a viewer. Additionally, the apparatus may include a disparity image generating section. The disparity generating section may be for selecting data of at least one of the source images, based on the determined left-eye viewpoint, as raw left-eye data. In addition, the disparity generating section may be for selecting data of at least one of the source images, based on the determined right-eye viewpoint, as raw right-eye data. The disparity generating section may also be for outputting left-eye image data, based on the raw left-eye data. Additionally, the disparity generating section may be for outputting right-eye image data, based on the raw right-eye data.

19 Claims, 17 Drawing Sheets

(56) References Cited

U.S. PATENT DOCUMENTS

2007/0285663 A1* 12/2007 Hewitt et al. ............ 356/399
2011/0261050 A1* 10/2011 Smolic et al. ............ 345/419

FOREIGN PATENT DOCUMENTS

| JP | 2008-193693 | 8/2008 |
| JP | 2010-8575 | 1/2010 |

* cited by examiner

[Fig. 8]

IMAGE PROCESSING APPARATUS AND METHOD, AND PROGRAM

TECHNICAL FIELD

The present disclosure relates to image processing apparatus and method, and a program, in particular, image processing apparatus and method, and a program, which make it possible to obtain stereoscopic images of a subject seen from a plurality of different viewpoint positions more easily.

BACKGROUND ART

In the related art, a technique is known which displays a subject stereoscopically by using a pair of images obtained by capturing the same subject from different viewpoints (see, for example, PTL 1).

For example, in the case of a typical camera, a subject is captured in a state in which the optical axis of the camera is substantially horizontal to the ground, and the obtained image is projected onto a screen that is perpendicular to the ground. In this case, it can be supposed that the viewpoint position of the user who sees the displayed image is located on a straight line that is substantially perpendicular to the screen on which the image is displayed.

Consequently, when an image is to be displayed stereoscopically with such a display system, the binocular disparity/parallax of the user is expressed as a shift of the image to the left and right. That is, the subject is displayed stereoscopically by use of a pair of images having a disparity in a direction which is perpendicular to the user's sight line direction and along which the user's left and right eyes are arranged.

CITATION LIST

Patent Literature

PTL 1: Japanese Unexamined Patent Application Publication No. 2010-8575

SUMMARY OF INVENTION

Technical Problem

On the other hand, as shown in FIG. 1, in the case of a display system with which a subject is captured by a camera 11 in a state in which the optical axis of the camera 11 lies in a direction perpendicular to the ground, and the obtained image is projected onto a screen parallel to the ground, the angle of rotation with respect to the direction of the vertical axis of the screen that is parallel to the ground remains as a degree of freedom. It should be noted that in FIG. 1, the right diagonal direction, the left diagonal direction, and the vertical direction that are orthogonal to each other indicate the x-direction, the y-direction, and the z-direction, respectively.

In the example of FIG. 1, a subject H11 is captured by the camera 11 in a state in which the optical axis of the camera 11 is parallel to the z-direction, that is, from above in the drawing. The image of the subject H11 is displayed on a screen that is parallel to the xy-plane.

Consequently, such a display system allows the user to look into the screen from various directions with the z-axis as the axis of rotation, making it difficult to display the subject H11 stereoscopically.

In the case where an image is displayed using a naked eye display scheme represented by the parallax barrier scheme or the lenticular scheme as the method of displaying a stereoscopic image, the direction of disparity is physically restricted by the direction of arrangement of slits or lenticular lenses provided in a display device for the image. For example, if slits or lenticular lenses are arranged in the x-direction in the drawing, the subject H11 is displayed stereoscopically by use of an image pair having a disparity in the x-direction. Consequently, the subject H11 is not observed in a stereoscopic manner unless the user sees the screen in such a way that the sight line direction becomes parallel to the y-direction.

It should be noted that in the case where an image is displayed stereoscopically by the liquid crystal shutter scheme (time division shutter scheme), unlike in the case of the naked eye display scheme, there is no physical restriction on the direction of disparity. Thus, in principle, it is possible to display the subject H11 stereoscopically no matter from which direction the user sees the screen.

However, in the case of displaying a stereoscopic image by the liquid crystal shutter scheme, an image pair having a disparity in a direction perpendicular to the user's sight line direction is required. For example, if the user's sight line direction is a direction parallel to the x-direction, an image pair having a disparity in the y-direction is required for stereoscopic display of an image, and if the user's sight line direction is a direction parallel to the y-direction, an image pair having a disparity in the x-direction is required.

In this way, in the liquid crystal shutter scheme, if an image pair having a disparity in a direction perpendicular to the user's sight line direction is used, it is possible to display the subject H11 stereoscopically irrespective of the user's sight line direction. However, usually, a change in the user's sight line direction is not assumed for images such as contents intended for stereoscopic vision. Accordingly, only an image pair having a disparity in a specific direction is prepared, and thus it has been impossible to deal with a change in the user's sight line direction.

The disclosed embodiments of the present invention have been made in view of the above circumstances, and make it possible to obtain stereoscopic images of a subject seen from a plurality of different viewpoint positions more easily.

Solution to Problem

There is disclosed an apparatus for processing source images having known viewpoints. The apparatus may include a viewpoint determining section for determining, relative to the known viewpoints, left-eye and right-eye viewpoints of a viewer. Additionally, the apparatus may include a disparity image generating section. The disparity generating section may be for selecting data of at least one of the source images, based on the determined left-eye viewpoint, as raw left-eye data. In addition, the disparity generating section may be for selecting data of at least one of the source images, based on the determined right-eye viewpoint, as raw right-eye data. The disparity generating section may also be for outputting left-eye image data, based on the raw left-eye data. Additionally, the disparity generating section may be for outputting right-eye image data, based on the raw right-eye data.

There is also disclosed a method of processing source images having known viewpoints. A processor may execute a program to cause an apparatus to perform the method. The program may be stored on a computer-readable medium. The method may include determining, relative to the known viewpoints, left-eye and right-eye viewpoints of a viewer. The method may also include selecting data of at least one of the source images, based on the determined left eye viewpoint, as raw left-eye data. In addition, the method may include selecting data of at least one of the source images, based on the determined right-eye viewpoint, as raw right-eye data. The method may also include outputting left-eye image data, based on the raw left-eye data. Additionally, the method may include outputting right-eye image data, based on the raw right-eye data.

Advantageous Effects of Invention

According to an aspect of the disclosed embodiments, it is possible to obtain stereoscopic images of a subject seen from a plurality of different viewpoint positions more easily.

DESCRIPTION OF EMBODIMENTS

Hereinbelow, embodiments of the present invention will be described with reference to the drawings.

First Embodiment

Overview of Present Invention

Figure 1:
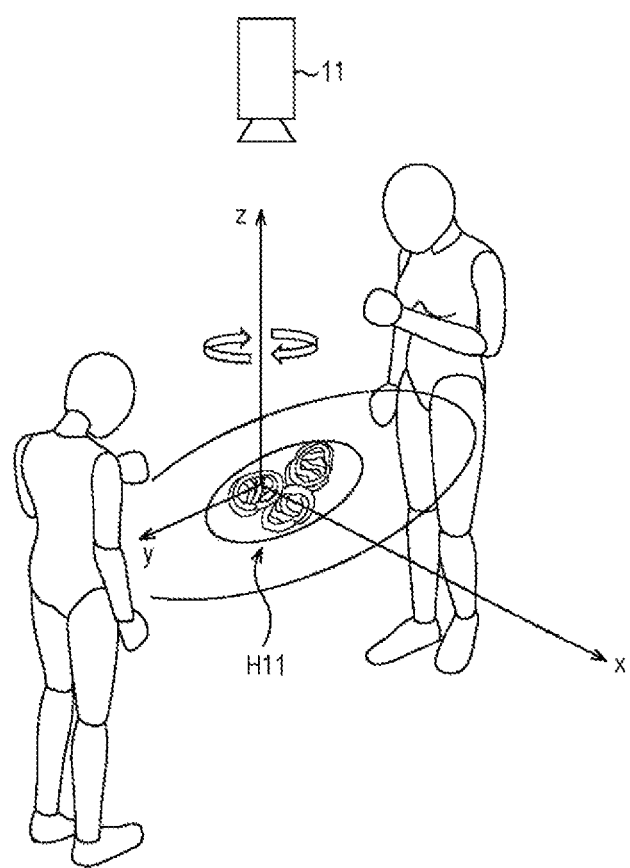
FIG. 1 is a diagram for explaining the relationship between an imaging system and a display system for a stereoscopic image according to the related art.
Figure 2:
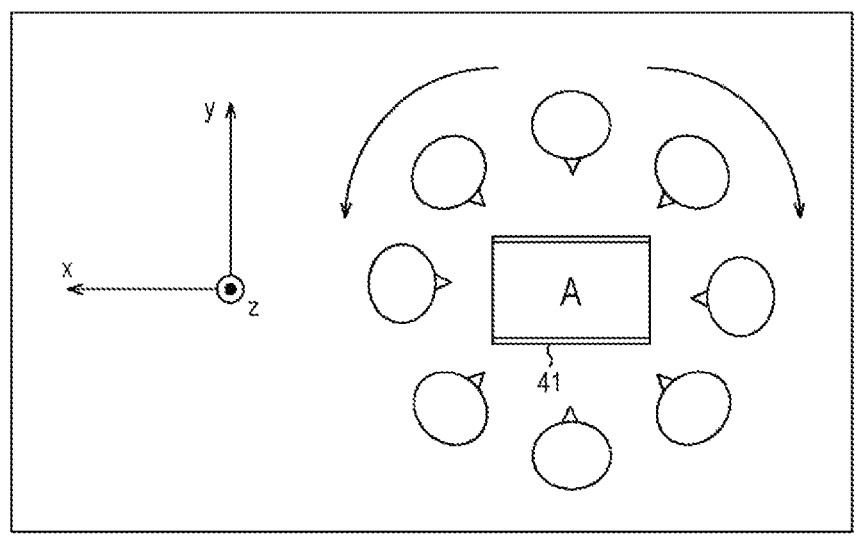
FIG. 2 is a diagram explaining about display of a stereoscopic image by an image processing apparatus consistent with an embodiment of the present invention.

For example, as shown in FIG. 2, an image processing apparatus consistent with an embodiment of the invention displays a subject in a stereoscopic manner on a display section 41 whose display screen is horizontal to the ground. It should be noted that in FIG. 2, the vertical direction, the lateral direction, and the depth direction respectively indicate the y-direction, the x-direction, and the z-direction.

The image processing apparatus displays a stereoscopic image by alternately displaying disparity images having a disparity with respect to each other, on a screen parallel to the xy-plane by the liquid crystal shutter scheme, for example. That is, the subject on the disparity images is displayed stereoscopically. At this time, the image processing apparatus detects the position on the xy-plane of a user who is seeing the displayed stereoscopic image, and determines the user's sight line direction from the position.

It should be noted that the user is supposed to view the stereoscopic image so as to look down the display section 41 substantially in the z-direction, from the vicinity of the edge of the display section 41. Also, the user's sight line direction is supposed to be a direction parallel to the xy-plane.

Upon determining the user's sight line direction, on the basis of the sight line direction, the image processing apparatus controls display of the stereoscopic image so that when the stereoscopic image is seen from the viewpoint position of the user, the subject on the stereoscopic image is observed in a stereoscopic manner.

More specifically, as shown in the upper left of FIG. 3, the image processing apparatus records a plurality of images (i.e., data of a plurality of images) (hereinafter, referred to as source images) having a disparity with respect to each other, which are obtained by capturing a specific object at each point in the xy-plane taken as a viewpoint.

Figure 3:
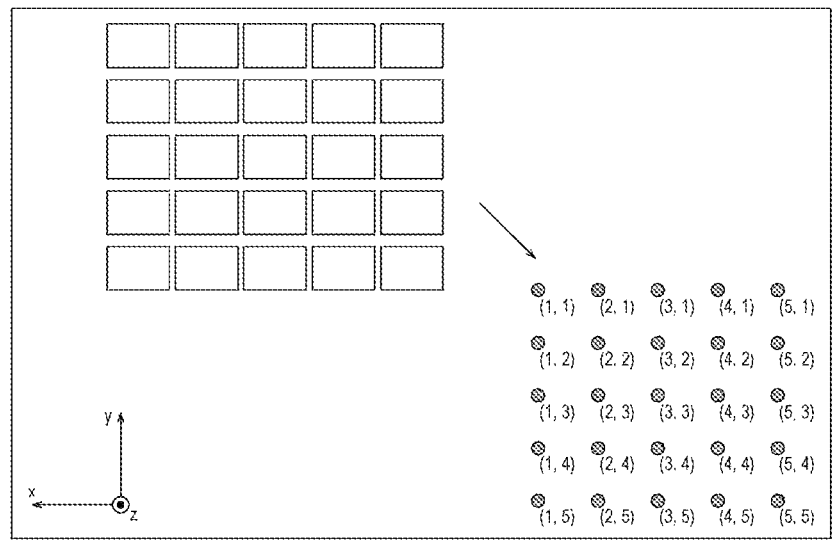
FIG. 3 is a diagram explaining about source images.

It should be noted that in FIG. 3, the vertical direction and the lateral direction indicate the y-direction and the x-direction, respectively. Also, in the drawing, each single rectangle represents a single source image, and in the drawing, each single circle in the lower right represents the viewpoint of a single source image.

In the example of FIG. 3, a total of 25, 5 (x-direction)*5 (y-direction) source images are prepared in advance. In FIG. 3, the positional relationship between the source images arranged in an array is the same as the positional relationship between the viewpoint positions of the respective source images. Therefore, these source images are images in which the same object seen from mutually different viewpoints is displayed.

In the following, the source images arranged in an array as shown in the upper left of FIG. 3 are considered as a set of grid points on the xy-plane by taking the viewpoint position of each of the source images as a grid point, as shown in the lower right in the drawing. Here, in the drawing, in the vicinity of each of the viewpoints in the lower right, coordinates of the viewpoint in the xy-coordinate system are shown. For example, in the drawing, of the set of grid points in the lower right, (1, 1) located in the vicinity of the viewpoint at the left edge of the uppermost stage represents the coordinates (x, y) in the xy-coordinate system of the viewpoint. That is, the coordinates (1, 1) represent the position of the viewpoint whose x-coordinate and y-coordinate are both 1.

In the image processing apparatus, disparity images are generated from the source images of individual viewpoints, with the set of grid points on the xy-plane taken as being located on the foreground side of the display section 41 in FIG. 2. That is, on the xyz-space, the positional relationship between the center of the display screen of the display section 41, and the viewpoint of each source image is supposed to be the same as the positional relationship between the subject of the source images and the viewpoint of each source image.

It should be noted that such source images are captured by a light-field camera or the like with which multi-viewpoint images can be acquired simultaneously while being arranged in an array. Also, the source images may be still images or may be moving images.

From the user's sight line direction and a disparity d of the disparity images to be displayed, the image processing apparatus determines a pair of points (hereinafter, referred to as display viewpoints) on the xy-plane which are arranged in a direction perpendicular to the sight line direction and whose distance is the same length as the disparity d. Then, with respect to each of the display viewpoints, the image processing apparatus selects several source images whose viewpoint positions (i.e., known viewpoints) are located in the vicinity of the display viewpoint, generates the disparity images of the respective display viewpoints from the selected source images, and displays a stereoscopic image on the basis of the obtained disparity image pair.

Since the pair of disparity images obtained in this way has the disparity d in a direction perpendicular to the user's sight line direction on the xy-plane, the subject on the disparity images is observed in a stereoscopic manner by the user.

<Configuration of Image Processing Apparatus>

Figure 4:
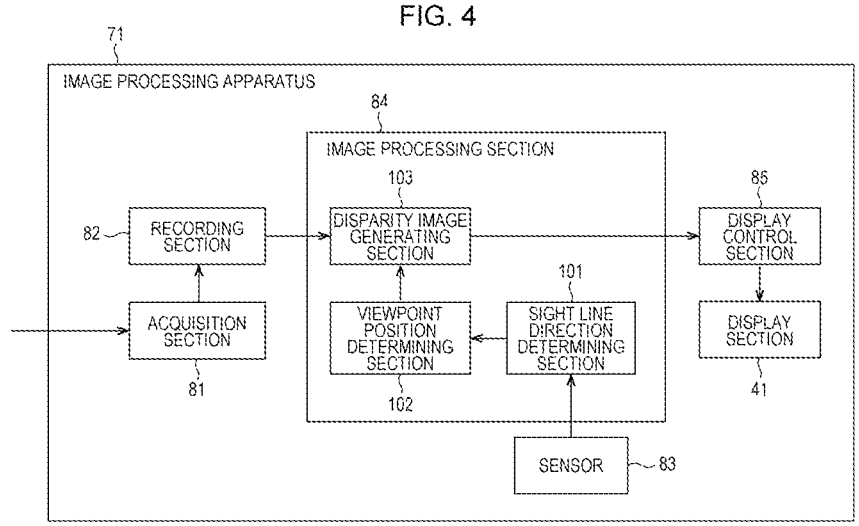
FIG. 4 is a diagram showing an example of the configuration of an image processing apparatus consistent with an embodiment of the present invention.

Next, a specific embodiment of the image processing apparatus described above will be described. FIG. 4 is a diagram showing an example of the configuration of an image processing apparatus consistent with an embodiment of the present invention. It should be noted that in the drawing, portions corresponding to those in the case of FIG. 2 are denoted by the same symbols, and description thereof is omitted as appropriate.

An image processing apparatus 71 in FIG. 4 includes the display section 41, an acquisition section 81, a recording section 82, a sensor 83, an image processing section 84, and a display control section 85.

The display section 41 is set so that the display screen becomes substantially perpendicular to the vertical direction, that is, parallel to the ground. The display section 41 displays a stereoscopic image by the liquid crystal shutter scheme on the basis of disparity images supplied from the display control section 85.

The acquisition section 81 acquires the source images described with reference to FIG. 3 from, for example, a removable medium or a camera mounted on the image processing apparatus 71, and supplies the source images to the recording section 82 for recording. The recording section 82 records the source images supplied from the acquisition section 81, and supplies the source images to the image processing section 84 as required. More specifically, the recording section 82 records the individual source images, and the viewpoint positions of those source images in association with each other.

The sensor 83 is formed by a plurality of human sensors, image sensors, or the like, which are provided to a table supporting the display section 41 or the housing of the display section 41 so as to surround the display screen of the display section 41. The sensor 83 detects the position of a user (human) who is present in the vicinity of the display section 41, and supplies the detection result to the image processing section 84.

The image processing section 84 generates a pair of disparity images from the detection result supplied from the sensor 83, and the source images recorded in the recording section 82. The image processing section 84 includes a sight line direction determining section 101, a viewpoint position determining section (i.e., a viewpoint determining section) 102, and a disparity image generating section 103.

The sight line direction determining section 101 determines the user's sight line direction from the detection result of the position of the user supplied from the sensor 83, and supplies the obtained sight line direction to the viewpoint position determining section 102. The viewpoint position determining section 102 determines display viewpoints that are the viewpoint positions of disparity images, from the disparity d that is specified in advance, and the sight line direction from the sight line direction determining section 101, and supplies the display viewpoints to the disparity image generating section 103.

The disparity image generating section 103 reads necessary source images from the recording section 82 on the basis of the display viewpoints supplied from the viewpoint position determining section 102, and generates disparity images on the basis of the read source images. The disparity image generating section 103 supplies the pair of generated disparity images to the display control section 85. The display control section 85 supplies the pair of disparity images supplied from the disparity image generating section 103 to the display section 41, and causes the disparity images to be displayed stereoscopically.

<Description of Stereoscopic Display Process>

Incidentally, when the user operates the image processing apparatus 71 to instruct display of a stereoscopic image, the image processing apparatus 71 performs a stereoscopic display process in response to the user's instruction, and causes a stereoscopic image to be displayed. Hereinbelow, referring to the flowchart in FIG. 5, the stereoscopic display process by the image processing apparatus 71 will be described.

In step S11, the sight line direction determining section 101 determines the user's sight line direction. That is, the sensor 83 detects the position of a user who is present around the display section 41, and supplies the detection result to the sight line direction determining section 101. Then, the sight line direction determining section 101 determines the user's sight line direction from the detection result from the sensor 83, and supplies the sight line direction to the viewpoint position determining section 102. For example, the direction of a vector whose starting point is the position of the user on a plane parallel to the xy-plane, and whose end point is the position of the center of the display screen of the display section 41 is defined as the sight line direction.

It should be noted that in the case when a plurality of users are detected around the display section 41 by the sensor 83, one of the users is selected, and the sight line direction of the user is determined. In the image processing apparatus 71, while the direction of disparity of disparity images also changes when the user's sight line direction changes, for the sake of the temporal stability of the disparity images, it is desirable that once a single user is selected from among a plurality of users, the user be selected continuously during playback of a stereoscopic image.

In step S12, the viewpoint position determining section 102 finds a pair of display viewpoints (i.e., left-eye and right-eye viewpoints) of disparity images from the user's sight line direction supplied from the sight line direction determining section 101, and the disparity d specified in advance. Here, the disparity d is, for example, the length of separation of the user's eyes assumed at the time of viewing of a stereoscopic image, which may be specified by the user or may be defined in advance.

Figure 6:
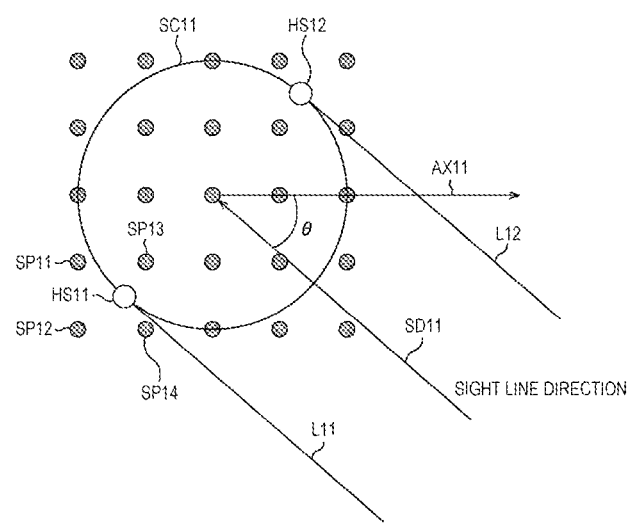
FIG. 6 is a diagram explaining about display viewpoints of disparity images.

For example, as shown in FIG. 6, the viewpoint position determining section 102 virtually draws a circle SC11 with a radius d/2, which is centered at the center position (hereinafter, referred to as reference position) of a set of individual viewpoints (grid points) of source images, on the xy-plane. It should be noted that in FIG. 6, the vertical direction and the lateral direction respectively indicate the y-direction and the x-direction, and each single circle represents the viewpoint of a single source image.

Upon drawing the circle SC11 with the radius d/2, the viewpoint position determining section 102 then finds the angle theta formed by a user's sight line direction SD11, and a virtual x-axis AX11 parallel to the x-direction, and finds a tangent L11 and a tangent L12 to the circle SC11 at the angle theta. These tangent L11 and tangent L12 are each a straight line that is parallel to the sight line direction SD11.

Upon finding the tangent L11 and the tangent L12 in this way, the viewpoint position determining section 102 defines the tangent points between these obtained tangent L11 and tangent L12, and the circle SC11 as a pair of display viewpoints. In the example of FIG. 6, a display viewpoint HS11 and a display viewpoint HD12 are obtained, the distance between these display viewpoint HS11 and display viewpoint HS12 is the disparity d between the disparity images to be displayed, and the straight line connecting the display viewpoint HS11 and the display viewpoint HS12 is orthogonal to the sight line direction SD11. Therefore, if a pair of disparity images whose viewpoint positions are these display viewpoint HS11 and display viewpoint HS12 is displayed stereoscopically, then the user who sees the disparity images from the sight line direction SD11 should be able to see the subject on the disparity images in a stereoscopic manner.

It should be noted that the display viewpoint HS11 is the viewpoint of a disparity image for the left eye which is observed by the left eye of the user, and the display viewpoint HS12 is the viewpoint of a disparity image for the right eye which is observed by the right eye of the user. As these disparity images for the right eye and the left eye are displayed by the liquid crystal shutter scheme, a stereoscopic image is displayed.

Figure 5:
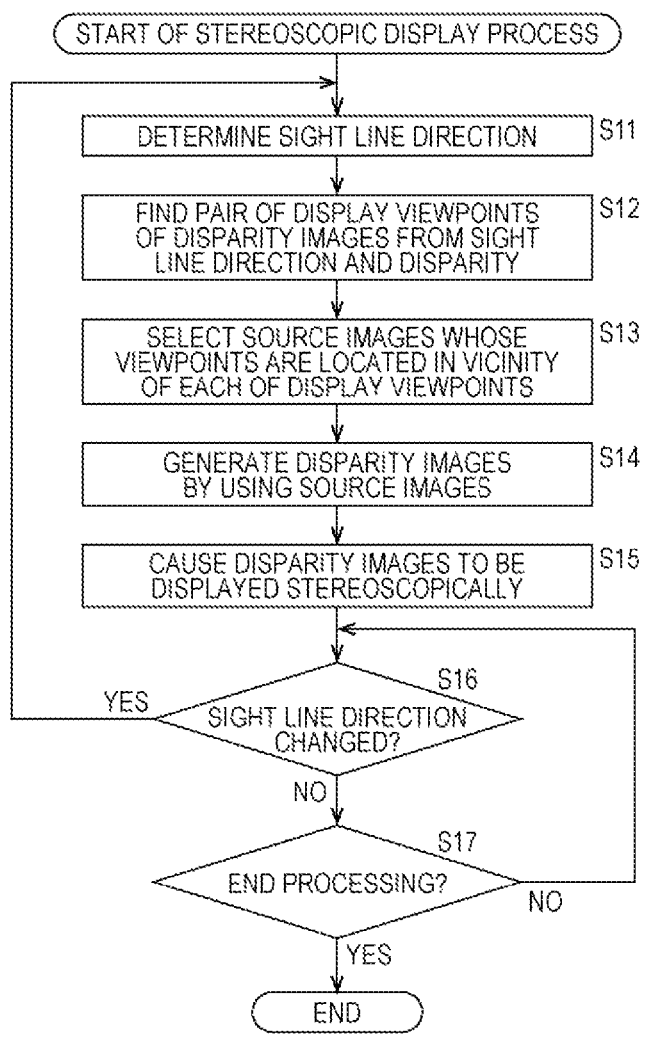
FIG. 5 is a flowchart explaining about a stereoscopic display process.

Returning to the description of the flowchart in FIG. 5, after finding the pair of display viewpoints, the viewpoint position determining section 102 supplies the found display viewpoints to the disparity image generating section 103, and the processing proceeds to step S13.

In step S13, on the basis of the display viewpoints supplied from the viewpoint position determining section 102, the disparity image generating section 103 selects several source images whose viewpoints are located in the vicinity of each of the display viewpoint on the xy-plane.

For example, in the example of FIG. 6, the disparity image generating section 103 selects four viewpoints SP11 to SP14 located in the vicinity of the display viewpoint HS11 and surrounding the display viewpoint HS11 (i.e., four viewpoints positioned at the corners of a rectangle), selects the source images of those viewpoints (i.e., raw left-eye data), and also reads the selected source images from the recording section 82. Likewise, the disparity image generating section 103 selects four viewpoints whose viewpoints are located in the vicinity of the display viewpoint HS12 (i.e., four viewpoints positioned at the corners of a rectangle), selects the source images of those viewpoints (i.e., raw right-eye data), and also reads the selected source images from the recording section 82.

In step S14, for each display viewpoint, the disparity image generating section 103 generates a disparity image (i.e., finished image data including at least one of left-eye or right-eye image data) by using the source images of the viewpoints located in the vicinity of the display viewpoint, which are selected in step S13.

Figure 7:
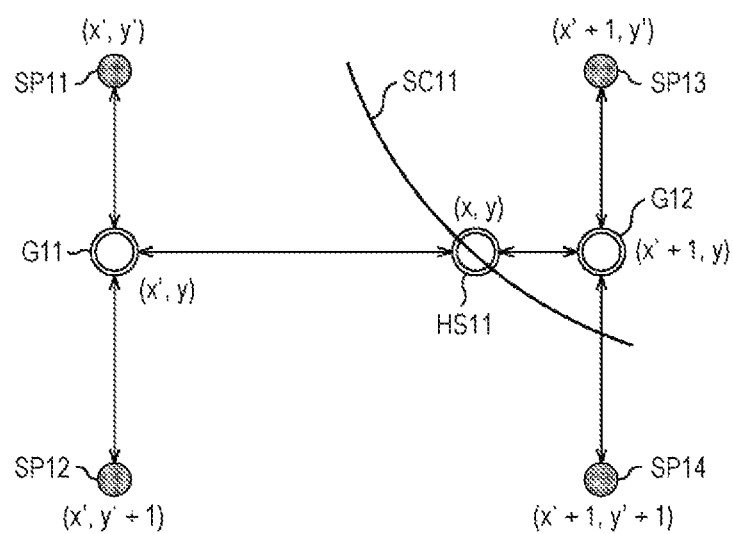
FIG. 7 is a diagram explaining about generation of a disparity image.

For example, as shown in FIG. 7, the disparity image generating section 103 generates a disparity image whose viewpoint is the display viewpoint HS11, by synthesizing the source images whose viewpoints are located in the vicinity of the display viewpoint HS11. It should be noted that FIG. 7 is a diagram showing the vicinity of the display viewpoint HS11 in FIG. 6 in an enlarged fashion. In the drawing, portions corresponding to those in the case of FIG. 6 are denoted by the same symbols, and description thereof is omitted. Also, in FIG. 7, the vertical direction and the lateral direction respectively indicate the y-direction and the x-direction.

First, the disparity image generating section 103 synthesizes the source image of the viewpoint SP11 located at coordinates (x', y'), and the source image of the viewpoint SP12 located at coordinates (x', y'+1) by a morphing method or the like, thereby generating the image of a viewpoint G11 located at coordinates (x', y).

For example, in the synthesis of the source images, the pixel values of pixels in the image of the viewpoint G11 can be found by interpolating the pixel values of pixels in the two source images at a ratio according to the distances from the viewpoint G11 to the viewpoint SP11 and the viewpoint SP12.

After generating the image of the viewpoint G11 in this way, the disparity image generating section 103 likewise synthesizes the source image of the viewpoint SP13 located at coordinates (x'+1, y'), and the source image of the viewpoint SP14 located at coordinates (x'+1, y'+1) by a morphing method or the like, thereby generating the image of a viewpoint G12 located at coordinates (x'+1, y).

Further, the disparity image generating section 103 synthesizes the image of the viewpoint G11 and the image of the viewpoint G12 by a morphing method or the like, thereby generating the disparity image of the display viewpoint HS11 located at coordinates (x, y). It should be noted that in the example of FIG. 7, after synthesis of source images arranged in the y-direction is performed, synthesis of images arranged in the x-direction is performed to thereby generate a disparity image. However, it is also possible to perform synthesis of source images arranged in the x-direction, and then perform synthesis of images arranged in the y-direction to thereby generate a disparity image.

Returning to the description of the flowchart in FIG. 5, after generating the disparity images of the pair of display viewpoints, the disparity image generating section 103 supplies the generated disparity image pair to the display control section 85, and the processing proceeds to step S15.

In step S15, the display control section 85 supplies the disparity image pair supplied from the disparity image generating section 103 to the display section 41, and causes the disparity image pair to be displayed stereoscopically by the liquid crystal shutter scheme. Thus, the disparity images can be seen in a stereoscopic manner by the user who is seeing the display section 41 while wearing dedicated glasses provided with liquid crystal shutters. That is, a stereoscopic image is observed.

In step S16, the sight line direction determining section 101 judges whether or not the user's sight line direction has changed. For example, the sight line direction is judged to have changed when a change in the user's sight line direction is detected from the detection result on the user supplied from the sensor 83.

If it is judged in step S16 that the sight line direction has changed, the processing returns to step S11, and the above-described process is repeated. That is, the user's new sight line direction is detected, a disparity image pair having a disparity in a direction perpendicular to the sight line direction is generated, and a stereoscopic image is displayed.

On the other hand, if it is judged in step S16 that the sight line direction has not changed, in step S17, the image processing apparatus 71 judges whether or not to end the process of displaying a stereoscopic image. For example, it is judged to end the processing when the image processing apparatus 71 is operated by the user, and it is instructed to end display of a stereoscopic image.

If it is judged in step S17 not to end the processing, the processing returns to step S16, and the above-described process is repeated. That is, the same stereoscopic image is displayed continuously until the user's sight line direction changes.

On the other hand, if it is judged in step S17 to end the processing, the image processing apparatus 71 causes display of a stereoscopic image to end, and the stereoscopic display process ends.

In the above-mentioned manner, the image processing apparatus 71 detects the sight line direction of a user who is present around the display section 41, and finds the display viewpoint of each disparity image to be displayed from the sight line direction. Then, the image processing apparatus 71 synthesizes, among source images of a plurality of different viewpoints, source images whose viewpoints are located in the vicinity of the display viewpoint, thereby generating the disparity image of the display viewpoint.

In this way, by detecting the user's sight line direction, finding display viewpoints of disparity images from the sight line direction, and generating the disparity images from source images whose viewpoints are located in the vicinity of their display viewpoints, it is possible to easily obtain disparity images with which a subject is observed in a stereoscopic manner by the user, irrespective of the viewpoint position of the user.

Moreover, according to the image processing apparatus 71, disparity images corresponding to an arbitrary sight line direction can be easily obtained. Thus, even when the user's sight line direction changes during viewing of a stereoscopic image, following the change in sight line direction, disparity images having a disparity in a different direction can be displayed stereoscopically. That is, no matter from which position 360 degrees around the display section 41 the user sees the display screen of the display section 41, the subject on the disparity images can be seen in a stereoscopic manner by the user.

As described above, according to the image processing apparatus 71, by using existing three-dimensional image display devices, a new capability is realized, whereby a stereoscopic image is displayed in such a way that a subject can be viewed stereoscopically from a free viewpoint of 360 degrees. It should be noted that the image processing apparatus 71 as described above can be applied to information displays of a type embedded in a table, projectors for surgical images, and the like.

It is particularly effective to apply the image processing apparatus 71 to, for example, playback systems which capture the operating part being surgically operated on by a light-field camera from directly above, and reconstruct the operating part seen from various positions in a three-dimensional fashion for stereoscopic display. In such a case, source images captured by the light-field camera are supplied to the image processing apparatus 71. In the image processing apparatus 71, from these source images, images during the surgical operation are generated as disparity images, and displayed stereoscopically.

In playback systems according to the related art, only disparity images on a fixed baseline are displayed stereoscopically. However, according to the image processing apparatus 71, a subject can be displayed stereoscopically from whatever direction, without being restricted to a specific baseline. Thus, it is possible to recreate movements of instruments during the operation, and the shape of the organ or the like to be surgically operated on, with a greater sense of realism. Also, it is possible to view images during the operation from the viewpoint of the surgical operator.

It should be noted that the foregoing description is directed to the case in which the disparity d is not larger than the maximum separation between viewpoints in a set of viewpoints (grid points) of source images. In this case, each disparity image is generated through synthesis by interpolation of source images whose viewpoints are located in the vicinity of its display viewpoint.

However, without limitation to this case, the display d may be larger than the maximum separation between viewpoints in a set of viewpoints of source images. In such a case, each disparity image is generated through synthesis by interpolation and extrapolation of source images of the four nearest viewpoints surrounding its display viewpoint.

Also, in the case where the separation of viewpoints of source images is sufficiently narrow, and spatial resolution is excellent, instead of generating the disparity image of each display viewpoint, a source image whose viewpoint is located closest to the display viewpoint may be displayed as a disparity image as it is. In this case as well, it is possible to obtain substantially the same effect as that in the case of generating each disparity image from several source images, thus allowing a subject to be displayed in a sufficiently stereoscopic manner.

Second Embodiment

Configuration of Image Processing Apparatus

Also, in the above-mentioned case, supposing that the disparity d that is the separation of the user's eyes is constant, it follows that display viewpoints are located on a circumference with a radius d/2, irrespective of the user's sight line direction. Accordingly, to compress the amount of information of the group of source images to be recorded in advance, by using acquired source images, source images whose viewpoints are located on the circumference may be generated for the purpose of recording, and only the generated source images whose viewpoints are located on the circumference (hereinafter, also referred to as recording source images) may be recorded in advance.

Figure 8:
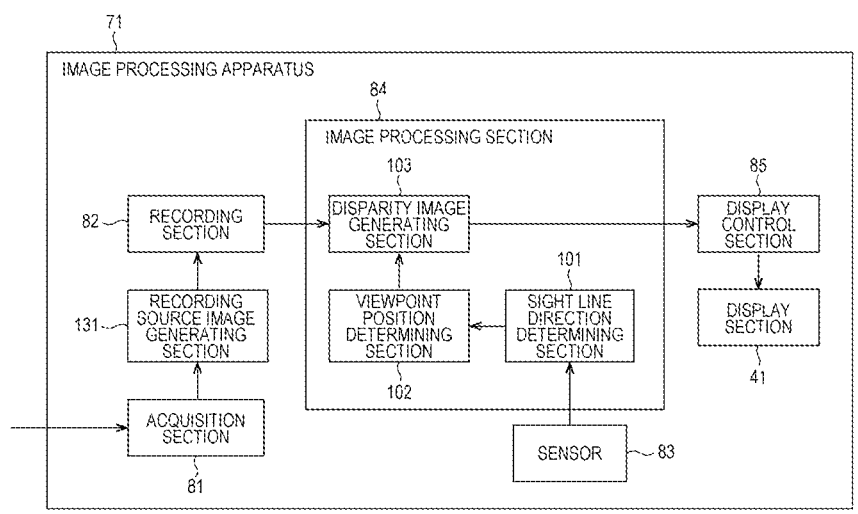
FIG. 8 is a diagram showing another example of the configuration of the image processing apparatus.

In such a case, the image processing apparatus 71 is configured as shown in FIG. 8, for example.

In the image processing apparatus 71 shown in FIG. 8, a recording source image generating section 131 is further provided in addition to the image processing apparatus 71 in FIG. 4. Otherwise, the configuration is the same as that of the image processing apparatus 71 in FIG. 4.

That is, in the image processing apparatus 71 in FIG. 8, the recording source image generating section 131 is provided between the acquisition section 81 and the recording section 82. It should be noted that in FIG. 8, portions corresponding to those in the case of FIG. 4 are denoted by the same symbols, and description thereof is omitted as appropriate.

The recording source image generating section 131 generates recording source images whose viewpoints are located at predetermined positions on the xy-plane, from source images acquired by the acquisition section 81, and supplies the recording source images to the recording section 82. It should be noted that the generated recording source images are recoded to the recording section 82.

<Description of Stereoscopic Display Process>

Next, referring to the flowchart in FIG. 9, a stereoscopic display process performed by the image processing apparatus 71 in FIG. 8 will be described.

In step S41, the recording source image generating section 131 defines viewpoint positions of recording source images on the basis of the disparity d that is specified in advance.

Specifically, the acquisition section 81 acquires a plurality of source images and supplies the source images to the recording source image generating section 131. Then, for example, as shown in FIG. 10, the recording source image generating section 131 virtually draws the circle SC11 with a radius d/2, which is centered at the reference position of a set of viewpoints (grid points) of the source images, on the xy-plane.

Figure 10:
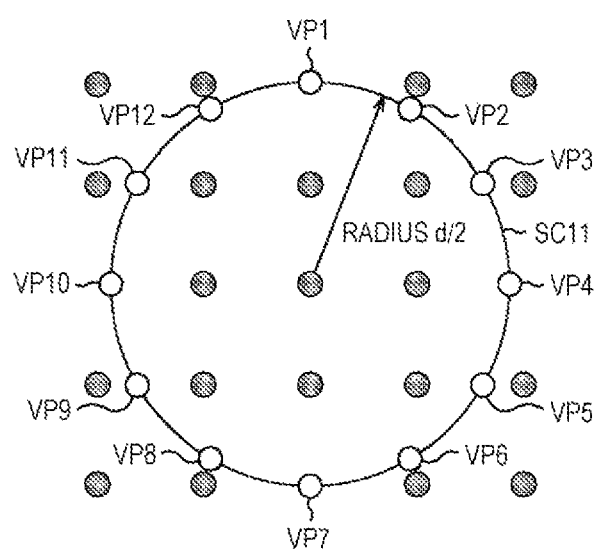
FIG. 10 is a diagram explaining about generation of recording source images.

It should be noted that in FIG. 10, the vertical direction and the lateral direction respectively indicate the y-direction and the x-direction, and each single circle located at a position different from a position on the circumference of the circle SC11 represents the viewpoint of a single source image. Also, in FIG. 10, portions corresponding to those in the case of FIG. 6 are denoted by the same symbols, and description thereof is omitted.

Upon drawing the circle SC11 on the xy-plane, the recording source image generating section 131 then defines 12 points that divide the circumference of the circle SC11 into equal parts, as viewpoints VP1 to VP12 of recording source images. It should be noted that the number and positions of points (viewpoints) that divide the circle SC11 into equal parts are arbitrary number and positions. Also, the viewpoints of recording source images may not necessarily be points that divide the circumference of the circle SC11 into equal parts.

In step S42, the recording source image generating section 131 generates the recording source images of the respective viewpoints by using the source images supplied from the acquisition section 81, and supplies the recording source images to the recording section 82.

For example, the recording source image generating section 131 generates a total of 12 recording source images whose respective viewpoints are the viewpoints VP1 to VP12 in FIG. 10. Specifically, for the viewpoint VP1, the viewpoint VP4, the viewpoint VP7, and the viewpoint VP10, source images whose viewpoints are located at the same positions already exist, and thus those source images are defined as the respective recording source images of the viewpoint VP1, the viewpoint VP4, the viewpoint VP7, and the viewpoint VP10.

Also, each of the recording source images of the other viewpoints is generated through synthesis by the morphing method of the four nearest viewpoints surrounding the viewpoint of the recording source image. That is, in the example of FIG. 10, each of the recording source images of the viewpoint VP2, the viewpoint VP3, the viewpoint VP5, the viewpoint VP6, the viewpoint VP8, the viewpoint VP9, the viewpoint VP11, and the viewpoint VP12 is generated through synthesis by interpolation of source images whose viewpoints are located in the vicinity.

After the recording source images are obtained in this way, the recording source image generating section 131 supplies the generated recording source images to the recording section 82. Then, in step S43, the recording section 82 records the recording source images supplied from the recording source image generating section 131.

In this way, by generating recording source images whose viewpoints are located on the circumference with a radius d/2 which is centered at the reference position on the xy-plane, and recording the recording source images in advance, the amount of images to be recorded in advance can be reduced.

For example, in the example of FIG. 10, only 12 recording source images need to be recorded in advance, when it is otherwise necessary to record 25 source images in advance.

Once the recording source images are recorded, thereafter, the processes in step S44 and step S45 are performed, and display viewpoints are found. Since these processes are the same as the processes in step S11 and step S12 in FIG. 5, description thereof is omitted.

In step S46, for each of the display viewpoints supplied from the viewpoint position determining section 102, the disparity image generating section 103 selects recording source images whose viewpoints are located in the vicinity of the display viewpoint (i.e., raw left-eye data or raw right-eye data).

Specifically, since a point located on the circle SC11 in FIG. 10 is found as each display viewpoint, the recording source images of viewpoints that are adjacent to and on both sides of the display viewpoint on the circle SC11 among the viewpoints VP1 to VP12 are selected. For example, if one display viewpoint is located between the viewpoint VP1 and the viewpoint VP2 on the circle SC11, the recording source image of the viewpoint VP1, and the recording source image of the viewpoint VP2 are selected.

Upon selecting recording source images whose viewpoints are located in the vicinity of the display viewpoint, the disparity image generating section 103 reads the selected recording source images from the recording section 82, and the processing proceeds to step S47.

In step S47, the disparity image generating section 103 finds the intersection point between a straight line connecting the display viewpoint and the farther viewpoint of the viewpoints of the selected recording source images from the display viewpoint, and a straight line connecting the nearer viewpoint of the viewpoints of the selected recording source images to the display viewpoint and the reference position. This intersection point (i.e., intermediate viewpoint) is found for each display viewpoint.

In step S48, the disparity image generating section 103 generates a recording source image (i.e., intermediate image data) whose viewpoint position is the position of the intersection point found for each display viewpoint. Then, in step S49, the disparity image generating section 103 generates a disparity image from the recording source image found in step S48, and the recording source image of the farther viewpoint from the display viewpoint.

Figure 11:
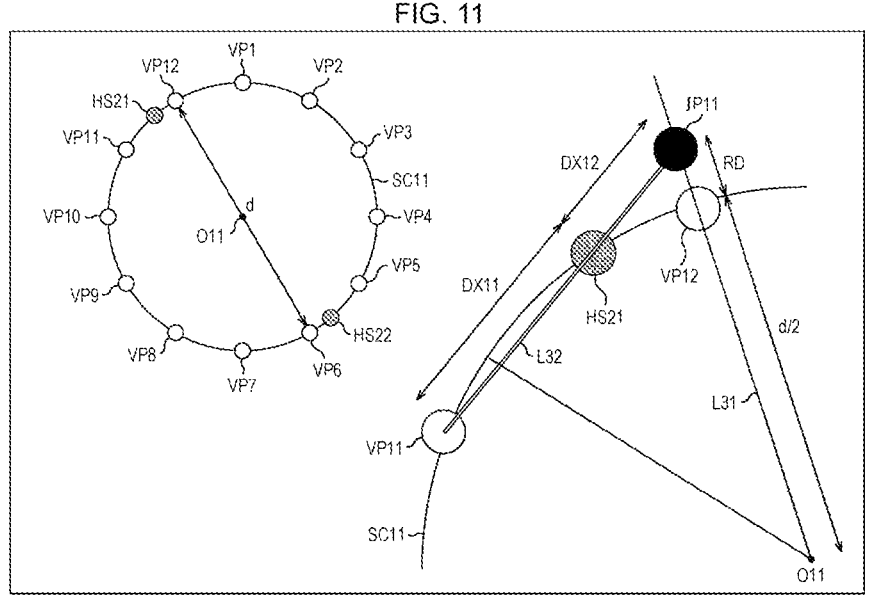
FIG. 11 is a diagram explaining about generation of a disparity image.

For example, as shown in FIG. 11, consider the case of generating the disparity images of a display viewpoint HS21 and a display viewpoint HS22 on the circle SC11 with a radius d/2 centered at a reference position O11.

It should be noted that in FIG. 11, portions corresponding to those in the case of FIG. 10 are denoted by the same symbols, and description thereof is omitted as appropriate. Also, in the right side of FIG. 11, the portion in the vicinity of the display viewpoint HS21 in the upper left in the drawing is shown in an enlarged fashion.

First, when generating the disparity image of the display viewpoint HS21, in step S46, the disparity image generating section 103 selects the viewpoint VP11 and the viewpoint VP12 that are adjacent to the display viewpoint HS21. Then, the disparity image generating section 103 finds a straight line L31 on the xy-plane which connects the viewpoint VP12, which is the nearer one to the display viewpoint HS21 of these viewpoints VP11 and VP12, and the reference position O11. It should be noted that the straight line L31 can be also said to be a straight line connecting the viewpoint VP6 located at a position opposed to the viewpoint VP12 on the circle SC11, that is, the viewpoint VP6 located on the side opposite to the viewpoint VP12, and the viewpoint VP12.

Next, the disparity image generating section 103 finds a straight line L32 that connects the viewpoint VP11, which is the farther one from the display viewpoint HS21 of the viewpoint VP11 and the viewpoint VP12 adjacent to the display viewpoint HS21, and the display viewpoint HS21, and finds an intersection point IP11 between this straight line L32 and the straight line L31. This process of finding the intersection point IP11 is the process in step S47.

Further, the disparity image generating section 103 synthesizes the recording source image of the viewpoint VP12, which is located on the straight line L31, and the recording source image of the viewpoint VP6 by a morphing method or the like, thereby generating a recording source image whose viewpoint position is the intersection point IP11.

More specifically, the disparity image generating section 103 finds a distance RD from the viewpoint VP12 to the intersection point IP11, and extrapolates the recording source image of the viewpoint VP12 and the recording source image of the viewpoint VP6 at a ratio between the distance RD and the distance d from the viewpoint VP12 to the viewpoint VP6, that is, at a ratio of d:RD. This process of generating the recording source image whose viewpoint position is the intersection point IP11 is the process in step S48.

Further, the disparity image generating section 103 synthesizes the recording source image of the viewpoint VP11, and the recording source image whose viewpoint position is the intersection point IP11 by a morphing method or the like, thereby generating the disparity image of the display viewpoint HS21.

More specifically, the disparity image generating section 103 finds a distance DX11 from the viewpoint VP11 to the display viewpoint HS21, and a distance DX12 from the display viewpoint HS21 to the intersection point IP11. Then, the disparity image generating section 103 interpolates the recording source image of the intersection point IP11, and the recording source image of the viewpoint VP11 at a ratio of DX11:DX12, thereby generating the disparity image of the display viewpoint HS21. This process of generating the disparity image is the process in step S49.

It should be noted that the disparity image of the display viewpoint HS22 is also generated in the same manner as the disparity image of the display viewpoint HS21. When disparity images are generated from recording source images whose viewpoints are located in the vicinity of their display viewpoints in this way, it is possible to easily obtain disparity images that are closer to the actual image and whose viewpoints are the found display viewpoints.

Also, in the example of FIG. 11, the description is directed to the case of generating a disparity image by synthesizing the recording source image of the viewpoint VP11, which is the farther from the display viewpoint HS21, and the recording source image of the intersection point IP11 in the vicinity of the nearer viewpoint VP12. However, this should not be construed restrictively. The disparity image of the display viewpoint HS21 may be generated by synthesizing the recording source image of the nearer viewpoint VP12, and the recording source image of a point corresponding to the intersection point IP11 in the vicinity of the farther viewpoint VP11.

It should be noted, however, that in this case, the position of the point corresponding to the intersection point IP11 in the vicinity of the viewpoint VP11 is located farther away from the circle SC11 than the intersection point IP11. Thus, degradation of image quality, which occurs due to extrapolation at the time of generating a recording source image, becomes greater than that at the time of generating the recording source image of the intersection point IP11. For this reason, it is desirable to generate the disparity image of the display viewpoint HS21 by using the viewpoint VP11 that is the farther from the display viewpoint HS21, and the recording source image of the intersection point IP11.

Figure 9:
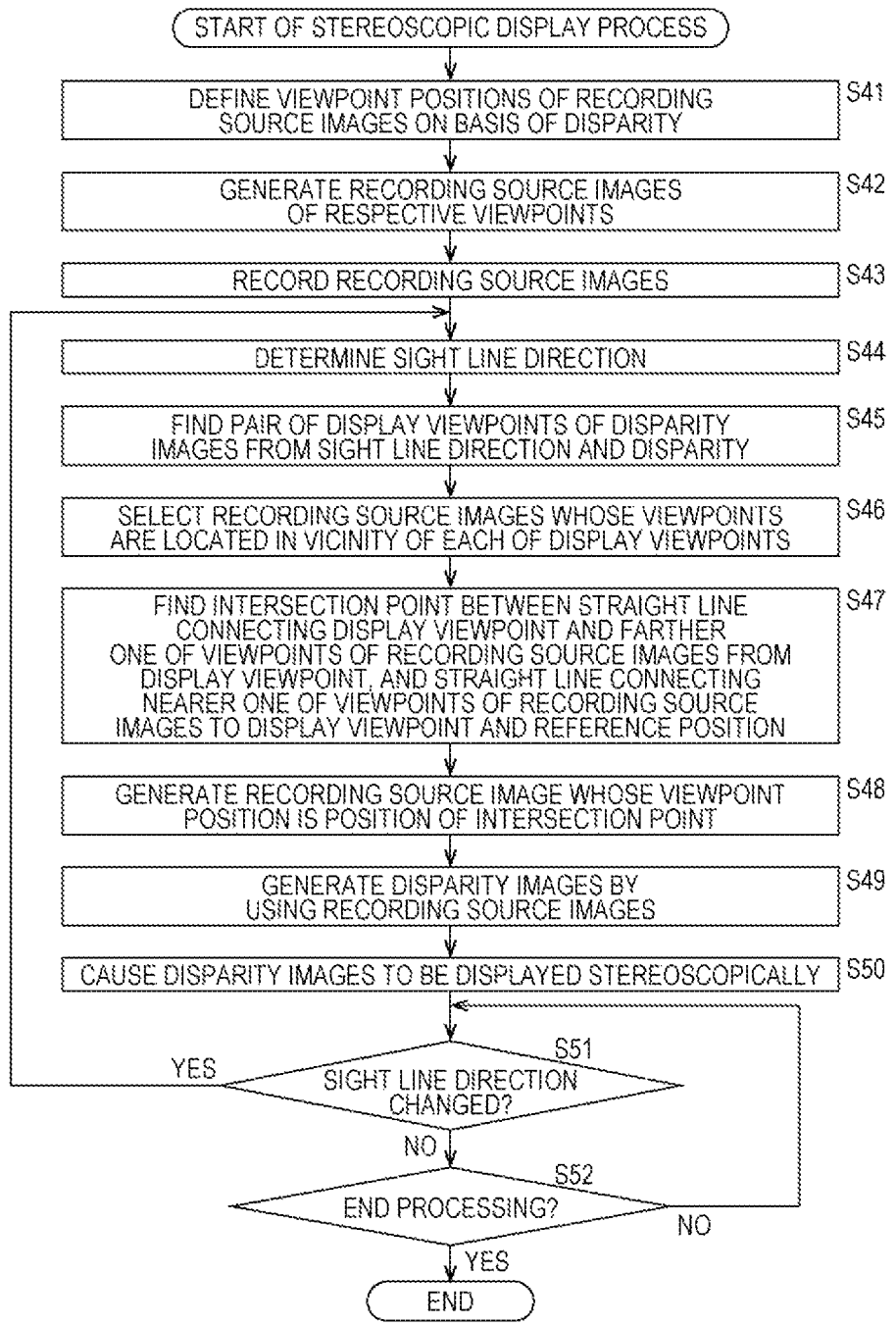
FIG. 9 is a flowchart explaining about a stereoscopic display process.

Returning to the description of the flowchart in FIG. 9, once disparity images are generated, thereafter, the processes in step S50 to step S52 are performed and the stereoscopic display process ends. Since these processes are the same as the processes in step S15 to step S17 in FIG. 15, description thereof is omitted.

In this way, in the image processing apparatus 71, recording source images are generated from acquired source images, and only the recording source images are recorded in advance. Thus, the recording capacity for images required for obtaining disparity images can be reduced. Also, in the image processing apparatus 71, display viewpoints are found from the user's sight line direction, and the disparity images of the display viewpoints are generated by using the recording source images that have been recorded. Thus, it is possible to easily obtain disparity images with which a subject is observed in a stereoscopic manner by the user, irrespective of the viewpoint position of the user.

It should be noted that in the case where recording source images that have been already recorded in the recording section 82 are used to generate disparity images, there is no need to generate recording source images. Thus, the processes in step S41 to step S43 in FIG. 9 are not performed.

Also, the foregoing description is directed to the case of performing compression of information by generating recording source images whose viewpoints are located on the circumference of the circle SC11, assuming that the disparity d as the distance of separation of user's eyes has a fixed value. However, the disparity d may be made variable.

In such a case, for example, the disparity image generating section 103 can generate recording source images whose viewpoints are located outside the circle SC11, by extrapolation using the recording source images of the viewpoint VP12 and the viewpoint VP6 in FIG. 11. Thus, for example, recording source images of a viewpoint VP12' and a viewpoint VP6' that are located outside the circle SC11 are obtained. By using such recording source images, it is possible to obtain a pair of disparity images of display viewpoints located outside the circle SC11, with the disparity enhanced.

That is, in this case, the viewpoint position determining section 102 draws a circle SC11' whose diameter equals a disparity d' that has been changed, and whose center position (reference position O11) is the same as the center position of the circle SC11 before the change of the disparity d, and determines each new display viewpoint located on the circle SC11'. By using recording source images recorded in the recording section 82, the disparity image generating section 103 generates recording source images of the viewpoint VP12' and so on whose viewpoints are located on the circle SC11', and generates each disparity image after the change of the disparity, by using, among the obtained recording source images, recording source images whose viewpoints are located in the vicinity of the new display viewpoint.

Likewise, the disparity image generating section 103 can also generate recording source images whose viewpoints are located inside the circumference of the circle SC11, by interpolation using the recording source images of the respective viewpoints VP1 to VP12 in FIG. 11. When recording source images obtained by interpolation are used, it is possible to obtain a pair of disparity images of display viewpoints located inside the circle SC11, with the disparity compressed.

In this way, since the recording source images of arbitrary viewpoints can be obtained by interpolation and extrapolation, the disparity image generating section 103 can generate a disparity image pair with a specified, arbitrary disparity d, with respect to an arbitrary sight line direction. It should be noted that since interpolation generally causes less image degradation than extrapolation, when recording source images are generated while supposing the maximum circumference that can be obtained from source images whose viewpoints are arranged in an array, disparity images with better image quality can be obtained with respect to an arbitrary disparity d.

Third Embodiment

Description of Stereoscopic Display Process

Further, in the example of FIG. 11, the description is directed to the case of generating a recording source image whose viewpoint position is the intersection point IP11, and generating a disparity image by using the recording source image, and the recording source image of the viewpoint VP11. In this case, image synthesis needs to be performed twice to generate a single disparity image. Consequently, the image quality of the finally obtained disparity image may sometimes deteriorate.

Accordingly, a recording source image whose viewpoint is located in the vicinity of each display viewpoint may be used to approximately generate the disparity image of the display viewpoint. Hereinbelow, referring to the flowchart in FIG. 12, a description will be given of a stereoscopic display process, which is performed in the case when the image processing apparatus 71 in FIG. 8 approximately generates the disparity image of each display viewpoint.

It should be noted that since the processes in step S81 to step S86 are the same as the processes in step S41 to step S46 in FIG. 9, description thereof is omitted.

In step S87, the disparity image generating section 103 generates disparity images by using recording source images read from the recording section 82.

Figure 13:
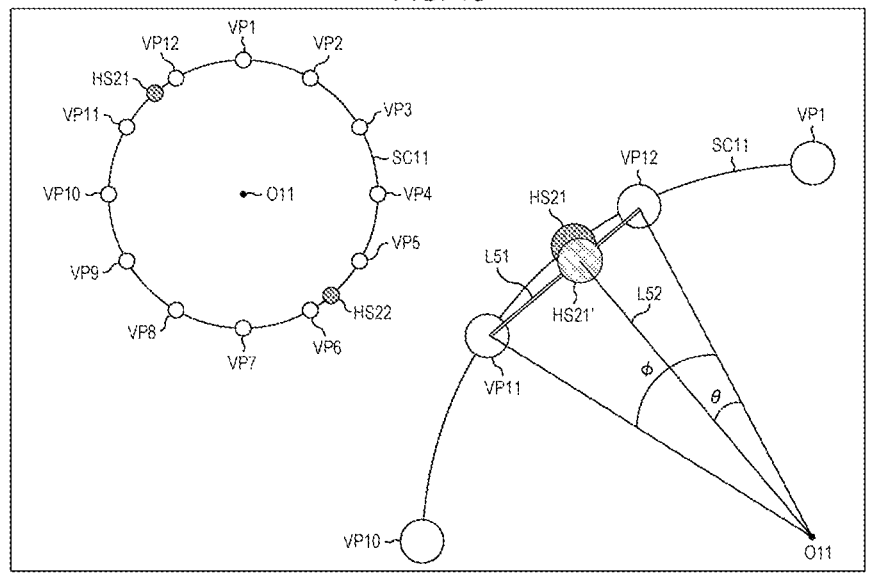
FIG. 13 is a diagram explaining about generation of a disparity image.

For example, as shown in FIG. 13, consider the case of generating the disparity images of the display viewpoint HS21 and the display viewpoint HS22. It should be noted that in FIG. 13, portions corresponding to those in the case of FIG. 11 are denoted by the same symbols, and description thereof is omitted. Also, in the right side of FIG. 13, the portion in the vicinity of the display viewpoint HS21 in the upper left in the drawing is shown in an enlarged fashion.

For example, suppose that, to generate the disparity image of the display viewpoint HS21, the recording source images of the viewpoint VP11 and the viewpoint VP12 which are adjacent to and on both sides of the display viewpoint HS21 on the circle SC11 are selected. That is, suppose that the disparity image is generated by using the recording source images of the viewpoint VP11 and the viewpoint VP12.

In this case, the disparity image generating section 103 defines, as a display viewpoint HS21', the position of the intersection point between a straight line L51 connecting these viewpoints VP11 and VP12, and a straight line L52 that passes through the reference position O11.

Then, the disparity image generating section 103 approximately regards the display viewpoint HS21' as the display viewpoint HS21, generates a disparity image whose viewpoint position is the display viewpoint HS21' from the recording source images of the viewpoint VP11 and the viewpoint VP12, and defines the obtained disparity image as the disparity image of the display viewpoint HS21. That is, the arc of the circle SC11 from the viewpoint VP11 to the viewpoint VP12 is regarded as a straight line, and the actual display viewpoint HS21 is substituted by the display viewpoint HS21'.

The disparity image of the display viewpoint HS21' is generated by synthesizing the recording source image of the VP11, and the recording source image of the viewpoint VP12 by a morphing method or the like.

More specifically, for example, the disparity image generating section 103 finds an angle phi that is formed by a straight line connecting the viewpoint VP12 and the reference position O11, and a straight line connecting the viewpoint VP11 and the reference position O11, and an angle theta that is formed by the straight line connecting the viewpoint VP12 and the reference position O11, and the straight line L52. Then, the disparity image generating section 103 interpolates the recording source image of the viewpoint VP12 and the recording source image of the viewpoint VP11 at the ratio between an angle (phi-theta) and the angle theta, that is, at the ratio of (phi-theta):theta, thereby generating the disparity image of the display viewpoint HS21'.

It should be noted that the disparity image of the display viewpoint HS22 is also generated in the same manner as the disparity image of the display viewpoint HS21. When disparity images are generated by synthesizing recording source images whose viewpoints are located in the vicinity of their display viewpoints in this way, it is possible to easily obtain disparity images that are closer to the actual image and whose viewpoints are the found display viewpoints.

Figure 12:
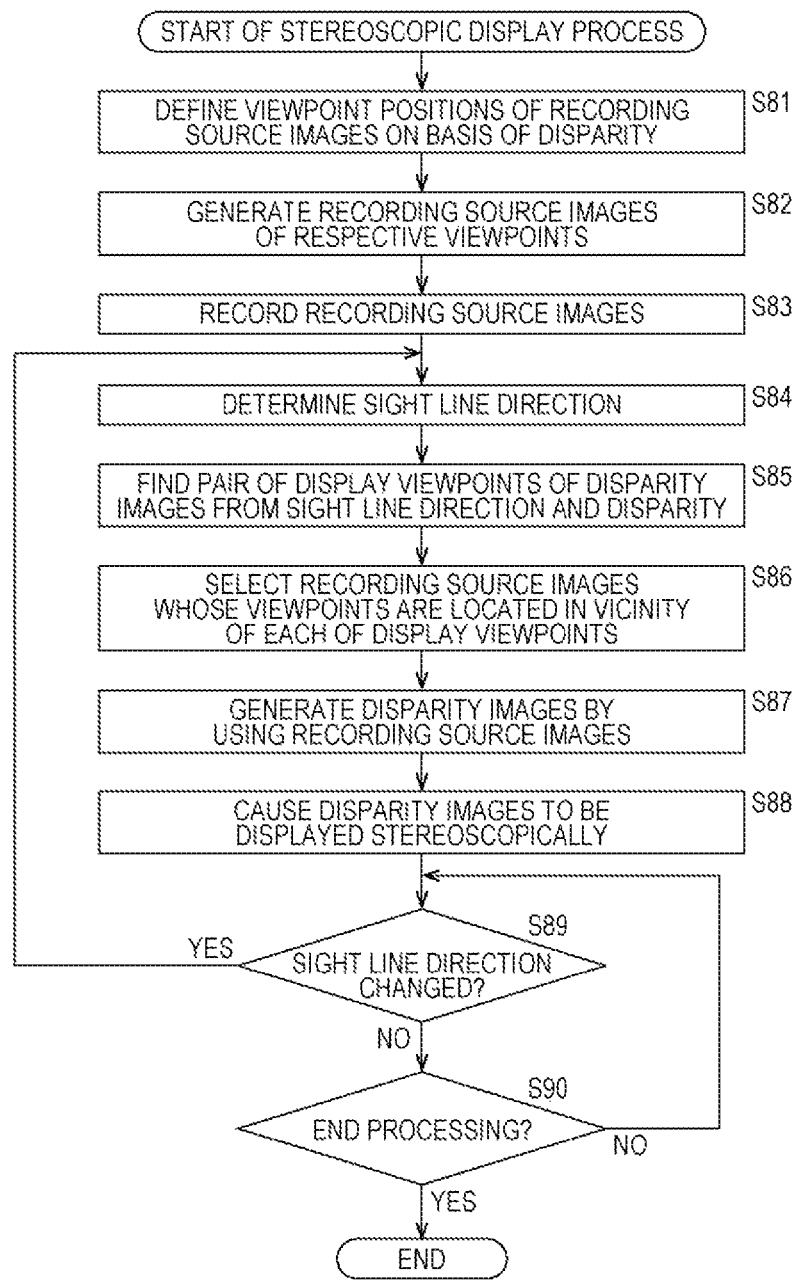
FIG. 12 is a flowchart explaining about a stereoscopic display process.

Returning to the description of the flowchart in FIG. 12, once disparity images are generated, thereafter, the processes in step S88 to step S90 are performed and the stereoscopic display process ends. Since these processes are the same as the processes in step S50 to step S52 in FIG. 9, description thereof is omitted.

In this way, the image processing apparatus 71 finds display viewpoints from the user's sight line direction, and synthesizes recording source images whose viewpoints are located in the vicinity of the display viewpoints, thereby approximately generating disparity images whose viewpoints are the display viewpoints. Thus, it is possible to easily and quickly obtain disparity images with which a subject is observed in a stereoscopic manner by the user, irrespective of the viewpoint position of the user.

Fourth Embodiment

Configuration of Image Processing Apparatus

It should be noted that in the example described above, a disparity image pair is displayed stereoscopically by the liquid crystal shutter scheme. Thus, if the sight line direction is substantially parallel to the xy-plane, the user can observe a subject in a stereoscopic manner no matter from which direction the user sees the display section 41.

However, in the case where a stereoscopic image is displayed by the parallax barrier scheme, the lenticular scheme, the polarization scheme, or the like, for the subject to be seen in a stereoscopic manner at the time when observing the stereoscopic image, the user must see the stereoscopic image from a specific direction (hereinafter, referred to as viewing direction). Accordingly, in the case where the user's viewing direction is restricted, the user may be allowed to specify the sight line direction with respect to the subject in an arbitrary fashion, so that the user can observe the stereoscopic image of the subject seen from the specified sight line direction.

Figure 14:
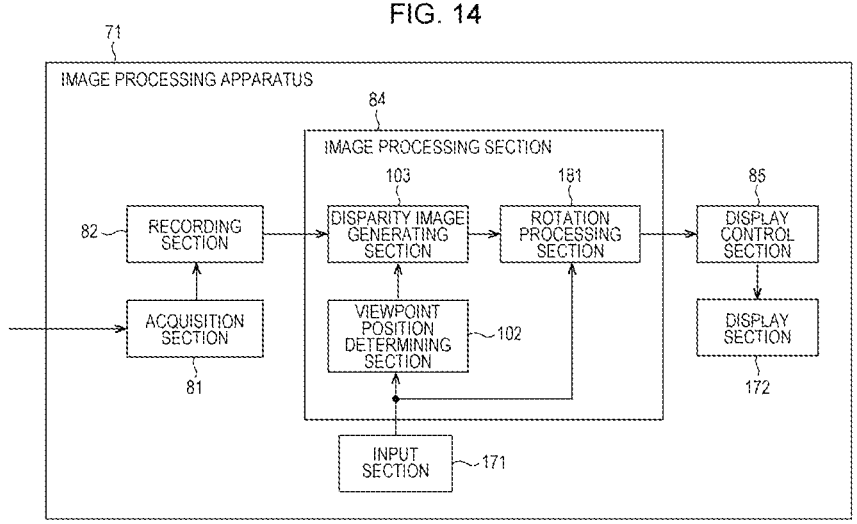
FIG. 14 is a diagram showing another example of the configuration of the image processing apparatus.

In such a case, the image processing apparatus 71 is configured as shown in FIG. 14, for example. It should be noted that in FIG. 14, portions corresponding to those in the case of FIG. 4 are denoted by the same symbols, and description thereof is omitted as appropriate.

The image processing apparatus 71 in FIG. 14 includes the acquisition section 81, the recording section 82, the image processing section 84, the display control section 85, an input section 171, and a display section 172.

The input section 171 is formed by an input device such as a dial or a mouse, for example, and is operated in cases such as when inputting the sight line direction. That is, the input section 171 accepts an input of the sight line direction or the like.

The image processing section 84 includes the viewpoint position determining section 102, the disparity image generating section 103, and a rotation processing section 181. The viewpoint position determining section 102 determines display viewpoints of disparity images on the xy-plane on the basis of the sight line direction supplied from the input section 171, and supplies the display viewpoints to the disparity image generating section 103.

The disparity image generating section 103 reads source images from the recording section 82, and generates the disparity images of the display viewpoints supplied from the viewpoint position determining section 102, by using the read source images. Also, the disparity image generating section 103 supplies the generated disparity images to the rotation processing section 181. The rotation processing section 181 rotates the disparity images supplied from the disparity image generating section 103, by an angle defined by the sight line direction supplied from the input section 171, and supplies the disparity images to the display control section 85.

The display section 172 is installed in such a way that the display screen is in a direction perpendicular to the vertical direction, that is, in a direction parallel to the xy-plane. The display section 172 displays the disparity images supplied from the display control section 85 by a predetermined display scheme such as the parallax barrier scheme, the lenticular scheme, or the polarization scheme.

Here, as in the case of the display section 41, the positional relationship between the center of the display screen of the display section 172, and the viewpoint of each source image on the xyz-space is supposed to be the same as the positional relationship between the subject of the source images and the viewpoint of each source image.

It should be noted that the display scheme for disparity images in the display section 172 may be any display scheme as long as the display scheme allows a subject on a stereoscopic image to be seen in a stereoscopic manner when the user observes the stereoscopic image from a specific direction. Also, in the following, it is supposed that the display section 172 displays a stereoscopic image in such a way that allows the user to see a subject on the stereoscopic image in a stereoscopic manner when the user's viewing direction is substantially parallel to the y-direction.

Further, while the following description is directed to the case in which the display screen of the display section 172 is in a direction parallel to the xy-plane, the installation direction of the display screen of the display section 172 may be any direction.

<Description of Stereoscopic Display Process>

Next, referring to the flowchart in FIG. 15, a stereoscopic display process performed by the image processing apparatus 71 in FIG. 14 will be described. It should be noted that since the processes in step S111 to step S113 are the same as the processes in step S12 to step S14 in FIG. 5, description thereof is omitted.

It should be noted that in step S111, the viewpoint position determining section 102 determines a pair of display viewpoints on the basis of the sight line direction supplied from the input section 171. Also, generated disparity images are supplied from the disparity image generating section 103 to the rotation processing section 181.

In step S114, the rotation processing section 181 rotates the disparity images supplied from the disparity image generating section 103, in accordance with the sight line direction supplied from the input section 171, and supplies the disparity images to the display control section 85.

For example, suppose that in the example shown in FIG. 6, the sight line direction SD11 is inputted through operation of the input section 171, and the disparity images of the display viewpoint HS11 and the display viewpoint HS12 are generated. Also, suppose that the user's viewing direction is a direction from the lower side to the upper side in the drawing.

In this example, since the user's viewing direction is parallel to the y-direction, in order for the user to be able to perceive the subject in a stereoscopic manner, the disparity image pair must have a disparity in the x-direction. On the other hand, since the angle formed by the sight line direction and the x-direction is theta, it follows that the actual direction of the disparity of the disparity image pair is inclined by an angle ((pi/2)−theta) with respect to the x-direction.

Accordingly, the rotation processing section 181 rotates the disparity images clockwise by the angle ((pi/2)−theta) in FIG. 6, and supplies the rotated disparity image pair as the final disparity image pair to the display control section 85. By rotating disparity images by the amount of inclination of the disparity direction in this way, the rotated disparity image pair has a disparity in the x-direction. Thus, it is possible to display the image of a subject seen from an arbitrary direction in a stereoscopic manner, even in the case where the user's viewing direction is restricted.

Figure 15:
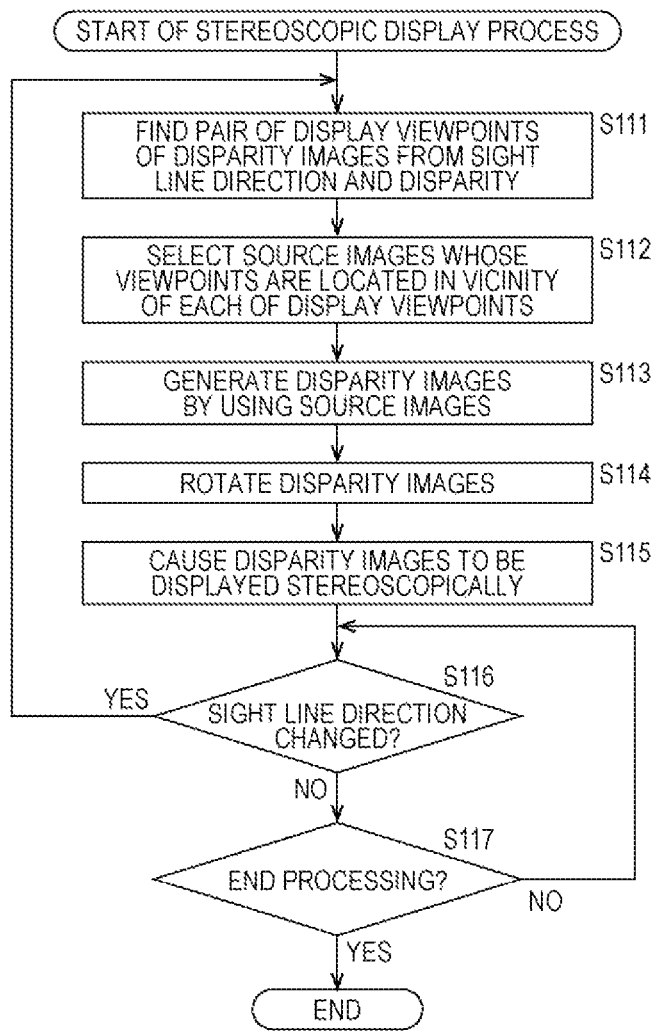
FIG. 15 is a flowchart explaining about a stereoscopic display process.

Returning to the description of the flowchart in FIG. 15, once the rotated disparity images are supplied to the display control section 85, the processing proceeds from step S114 to step S115.

In step S115, the display control section supplies the disparity image pair supplied from the rotation processing section 181 to the display section 172, and causes the disparity image pair to be displayed stereoscopically by the lenticular scheme or the like. Thus, the subject on the disparity images is seen in a stereoscopic manner by the user who is seeing the display section 172 with naked eyes. That is, a stereoscopic image is displayed.

In step S116, the viewpoint position determining section 102 judges whether or not the user's sight line direction has changed. For example, the sight line direction is judged to have changed when a new sight line direction is supplied from the input section 171.

If it is judged in step S116 that the sight line direction has changed, the processing returns to step S111, and the above-described process is repeated. That is, on the basis of the newly inputted sight line direction, disparity images having a disparity in the x-direction are generated, and are displayed stereoscopically.

On the other hand, if it is judged in step S116 that the sight line direction has not changed, in step S117, the image processing apparatus 71 judges whether or not to end the process of displaying a stereoscopic image. If it is judged in step S117 not to end the processing, the processing returns to step S116, and the above-described process is repeated.

On the other hand, if it is judged in step S117 to end the processing, the image processing apparatus 71 causes display of a stereoscopic image to end, and the stereoscopic display process ends.

In the manner as described above, on the basis of the inputted sight line direction, the image processing apparatus 71 causes disparity images to be displayed while being rotated so that the disparity direction and the viewing direction are orthogonal to each other. By rotating disparity images in accordance with the inputted sight line direction in this way, even in the case where the viewing direction for a stereoscopic image is defined, the user can observe the subject in a stereoscopic manner from an arbitrary direction while freely changing the sight line direction.

Fifth Embodiment

Configuration of Image Processing Apparatus

Also, in the case where disparity images are displayed stereoscopically by the lenticular scheme or the like as well, as in the case of the image processing apparatus 71 shown in FIG. 8, the amount of data of images to be recorded in advance may be reduced by generating recording source images from source images.

Figure 16:
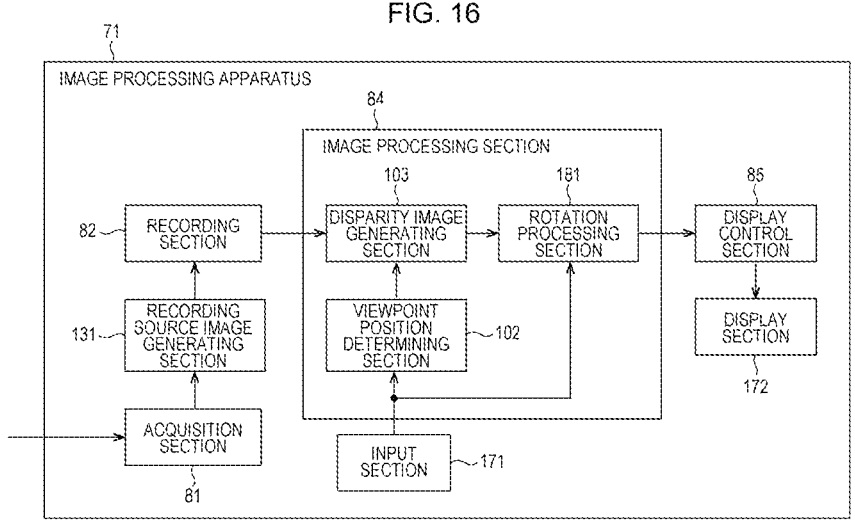
FIG. 16 is a diagram showing another example of the configuration of the image processing apparatus.

In such a case, the image processing apparatus 71 is configured as shown in FIG. 16, for example. It should be noted that in FIG. 16, portions corresponding to those in the case of FIG. 8 or FIG. 14 are denoted by the same symbols, and description thereof is omitted as appropriate.

The image processing apparatus 71 in FIG. 16 is configured such that the recording source image generating section 131 shown in FIG. 8 is further provided to the image processing apparatus in FIG. 14. That is, in the recording source image generating section 131, recording source images are generated from source images acquired by the acquisition section 81, and the generated recording source images are recorded to the recording section 82.

<Description of Stereoscopic Display Process>

Next, referring to the flowchart in FIG. 17, a stereoscopic display process performed by the image processing apparatus 71 in FIG. 16 will be described.

It should be noted that in step S141 to step S143, the same processes as the processes in step S41 to step S43 in FIG. 9 are performed. That is, points on the circumference of a circle centered at a predetermined reference position on the xy-plane are defined as viewpoint positions of recording source images, and from one or a plurality of source images whose viewpoints are located in the vicinity of each of the viewpoints, recording source images are generated, and are recorded to the recording section 82.

Then, thereafter, the processes in step S144 to step S148 are performed. It should be noted that since these processes are the same as the processes in step S45 to step S49 in FIG. 9, detailed description thereof is omitted.

It should be noted, however, that in step S144, the viewpoint position determining section 102 determines display viewpoints of disparity images from the sight line direction supplied from the input section 171 and the disparity d that is specified. Also, the disparity images of the display viewpoints are generated through the process described with reference to FIG. 11. The disparity images generated in this way are supplied from the disparity image generating section 103 to the rotation processing section 181.

In step S149, the rotation processing section 181 rotates the disparity images supplied from the disparity image generating section 103, on the basis of the sight line direction supplied from the input section 171, and supplies the disparity images to the display control section 85. That is, in step S149, the same process as that in step S114 in FIG. 15 is performed.

Once the rotated disparity images are generated, thereafter, the processes in step S150 to step S152 are performed and the stereoscopic display process ends. Since these processes are the same as the processes in step S115 to step S117 in FIG. 15, description thereof is omitted.

In this way, in the case where disparity images are displayed by the lenticular scheme or the like as well, when recording source images are generated from source images and recorded in advance, the recording capacity for images required for generating the disparity images can be reduced.

Sixth Embodiment

Description of Stereoscopic Display Process

Figure 18:
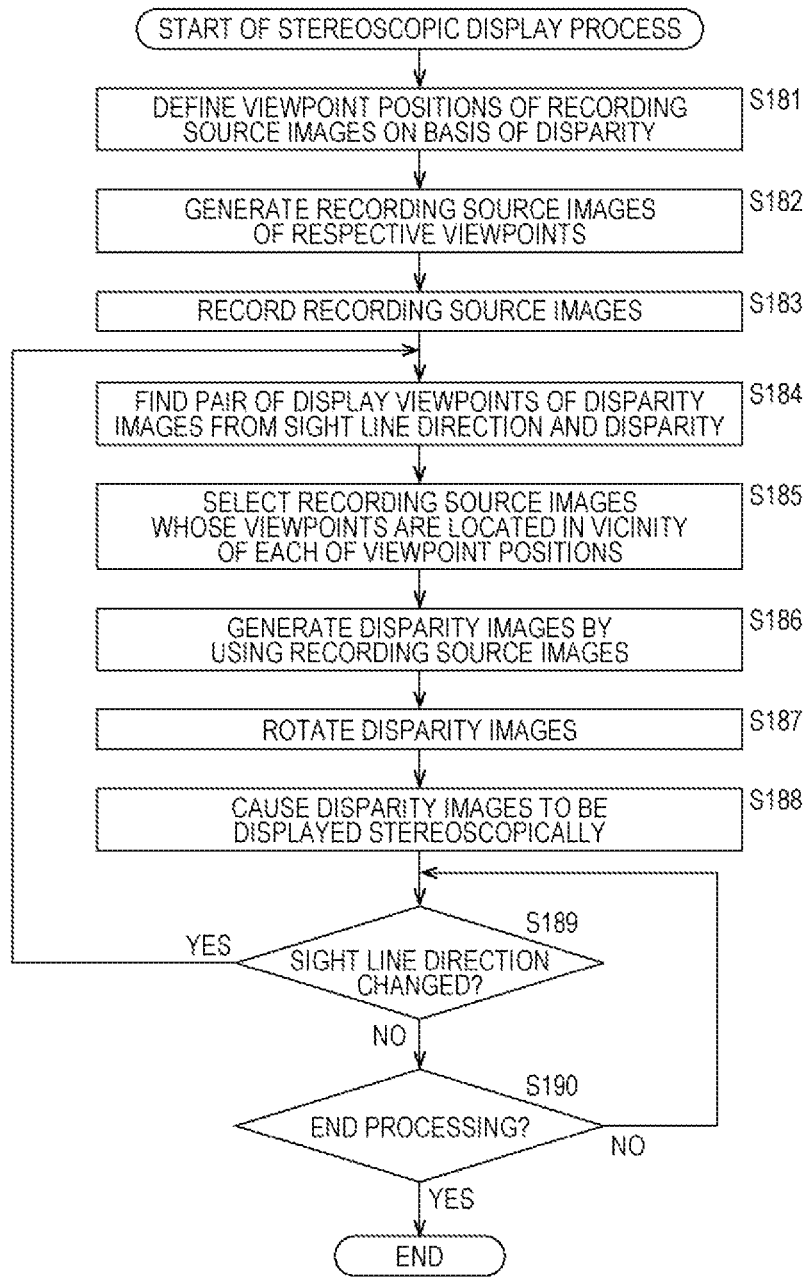
FIG. 18 is a flowchart explaining about a stereoscopic display process.

Further, the image processing apparatus 71 in FIG. 16 may generate disparity images by performing the same process as the process described with reference to FIG. 13. Hereinbelow, referring to the flowchart in FIG. 18, a description will be given of a stereoscopic display process which is performed in the case when the image processing apparatus 71 in FIG. 16 approximately generates disparity images of display viewpoints.

Figure 17:
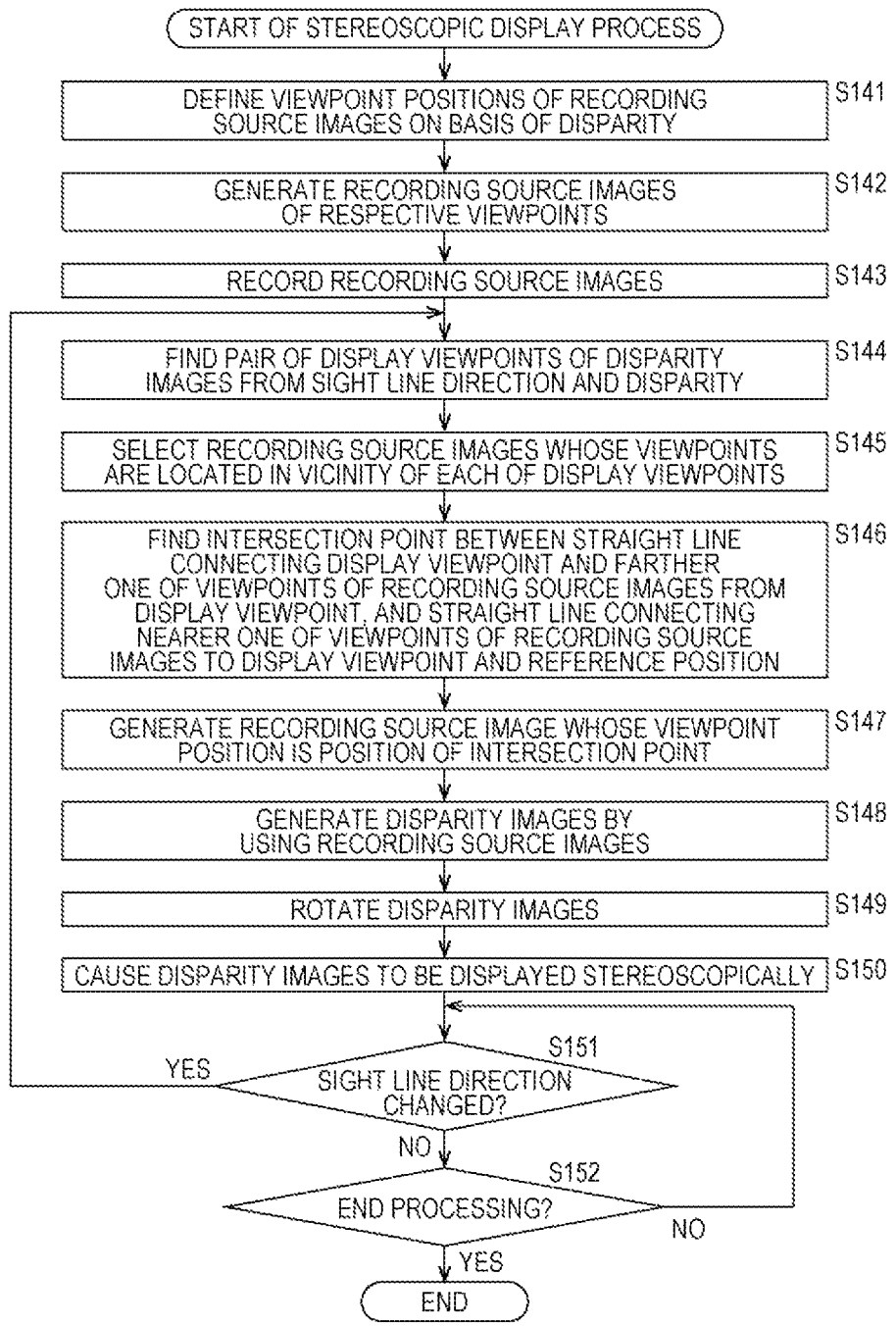
FIG. 17 is a flowchart explaining about a stereoscopic display process.

It should be noted that since the processes in step S181 to step S184 are the same as the processes in step S141 to step S144 in FIG. 17, description thereof is omitted.

In step S185, for each of display viewpoints supplied from the viewpoint position determining section 102, the disparity image generating section 103 selects recording source images whose viewpoints are located in the vicinity of the display viewpoint, and reads the selected recording source images from the recording section 82.

For example, as shown in FIG. 13, the recording source images of the viewpoint VP11 and the viewpoint VP12 which are adjacent to and on both sides of the display viewpoint HS21, and the recording source images of the viewpoint VP5 and the viewpoint VP6 which are adjacent to and on both sides of the display viewpoint HS22 are selected, and read.

In step S186, the disparity image generating section 103 generates disparity images by using the read recording source images, and supplies the disparity images to the rotation processing section 181. For example, in the example in FIG. 13, the recording source images of the viewpoint VP11 and the viewpoint VP12 are synthesized by a morphing method or the like into a disparity image, and likewise, the recording source images of the viewpoint VP5 and the viewpoint VP6 are synthesized by a morphing method or the like into a disparity image.

Then, thereafter, the processes in step S187 to step S190 are performed and the stereoscopic display process ends. Since these processes are the same as the processes in step S149 to step S152 in FIG. 17, description thereof is omitted. That is, the obtained disparity images are rotated in accordance with the sight line direction and displayed stereoscopically.

In the manner as described above, by finding display viewpoints from the inputted sight line direction, and synthesizing recording source images whose viewpoints are located in the vicinity of the display viewpoints to thereby approximately generate disparity images whose viewpoints are the display viewpoints, it is possible to easily and quickly obtain disparity images with which a subject is observed in a stereoscopic manner by the user.

The series of processes described above can be either executed by hardware or executed by software. If the series of processes is to be executed by software, a program constituting the software is installed into a computer embedded in dedicated hardware, or into, for example, a general-purpose personal computer or the like that can execute various kinds of function when installed with various kinds of program, from a program-recording medium (i.e., a non-transitory, computer-readable storage medium).

Figure 19:
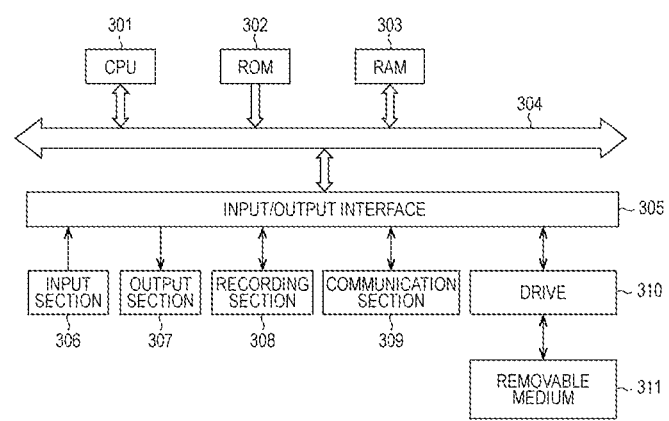
FIG. 19 is a block diagram showing an example of the configuration of a computer.

FIG. 19 is a block diagram showing an example of the hardware configuration of a computer that executes the above-mentioned series of processes.

In the computer, a CPU (Central Processing Unit) 301, a ROM (Read Only Memory) 302, and a RAM (Random Access Memory) 303 are connected to each other via a bus 304.

The bus 304 is further connected with an input/output interface 305. The input/output interface 305 is connected with an input section 306 formed by a keyboard, a mouse, a microphone, or the like, an output section 307 formed by a display, a speaker, or the like, a recording section 308 formed by a hard disk, a non-volatile memory, or the like, a communication section 309 formed by a network interface or the like, and a drive 310 for driving a removable medium 311 such as a magnetic disc, an optical disc, a magneto-optical disc, or a semiconductor memory.

In the computer configured as described above, the above-mentioned series of processes is performed when the CPU 301 loads a program recorded in the recording section 308 into the RAM 303 via the input/output interface 305 and the bus 304, and executes the program, for example.

The program executed by the computer (CPU 301) is provided by being recorded on the removable medium 311 that is a packaged medium formed by, for example, a magnetic disc (including a flexible disc), an optical disc (such as a CD-ROM (Compact Disc-Read Only Memory) or a DVD (Digital Versatile Disc)), a magneto-optical disc, a semiconductor memory, or the like, or via a wired or wireless transmission medium such as a local area network, the Internet, or digital satellite broadcast.

Then, the program can be installed into the recording section 308 via the input/output interface 305, by mounting the removable medium 311 in the drive 310. Also, the program can be received by the communication section 309 via a wired or wireless transmission medium, and installed into the recording section 308. Alternatively, the program can be pre-installed into the ROM 302 or the recording section 308.

It should be noted that the program executed by the computer may be a program in which processes are performed in a time-series fashion in the order as described in this specification, or may be a program in which processes are performed at necessary timing such as when invoked.

It should be noted that embodiments of the present invention are not limited to the above-described embodiments, and various modifications are possible without departing from the scope of the present invention.

REFERENCE SIGNS LIST 41 display section
71 image processing apparatus
83 sensor
84 image processing section
101 sight line direction determining section
102 viewpoint position determining section
103 disparity image generating section
131 recording source image generating section
181 rotation processing section

The invention claimed is:

1. A method of processing source images having known viewpoints, comprising:
   detecting, by a sensor, a position of a viewer;
   determining a sight line direction of the viewer based on the detected position;
   determining left-eye and right-eye viewpoints of the viewer based on the determined sight line direction, wherein the left-eye and right-eye viewpoints are determined based on tangent points where two tangents parallel to the sight line direction touch a circle with a diameter equal to a distance between eyes of the viewer, and wherein the circle represents a circle virtually drawn along a plane parallel to a plane of a display screen;
   selecting data of at least one of the source images, based on the determined left-eye viewpoint, as raw left-eye data;
   selecting data of at least one of the source images, based on the determined right-eye viewpoint, as raw right-eye data;
   outputting left-eye image data, based on the raw left-eye data; and
   outputting right-eye image data, based on the raw right-eye data.

2. The method of claim 1, wherein the left-eye and right-eye image data are output to the display screen.

3. The method of claim 1, comprising:
   determining the sight line direction of the viewer, along the plane parallel to a plane of the display screen.

4. The method of claim 1, comprising:
   detecting the position of the viewer in the plane parallel to the plane of the display screen.

5. The method of claim 1, comprising determining the sight line direction based on a center position of the display screen.

6. The method of claim 1, comprising determining the left-eye and right-eye viewpoints of the viewer based on a disparity representative of the distance between the eyes of the viewer.

7. The method of claim 1, wherein each of the raw left-eye and raw right-eye data represents four of the source images.

8. The method of claim 7, wherein the four of the source images have known viewpoints positioned at the corners of a rectangle encompassing one of the determined left-eye viewpoint and right-eye viewpoint present on the circle.

9. The method of claim 8, comprising interpolating, based on the known viewpoints positioned at the corners of the rectangle, finished image data including at least one of the left-eye or right-eye image data.

10. The method of claim 1, wherein the raw left-eye data differs from the raw right-eye data.

11. The method of claim 1, wherein each of the raw left-eye and raw right-eye data represents two of the source images.

12. The method of claim 11, wherein the two of the source images have known viewpoints positioned along the circle.

13. The method of claim 12, comprising interpolating, based on the known viewpoints positioned along the circle, finished image data including at least one of the left-eye or right-eye image data.

14. The method of claim 12, wherein a third source image has a known viewpoint positioned along the circle and directly across the circle from one of the known viewpoints of the two of the source images.

15. The method of claim 14, comprising extrapolating, based on (i) the one of the known viewpoints of the two of the source images and (ii) the known viewpoint of the third source image, intermediate image data representing an image having an intermediate viewpoint.

16. The method of claim 15, comprising interpolating, based on (i) another one of the known viewpoints of the two of the source images and (ii) the intermediate viewpoint, finished image data including at least one of the left-eye image data or right-eye image data.

17. The method of claim 1, comprising:
detecting, by the sensor, whether the position of the viewer has changed.

18. An apparatus for processing source images having known viewpoints, comprising:
a sensor detecting a position of a viewer;
a sightline determining section for determining a sight line direction of the viewer based on the detected position;
a viewpoint determining section for determining left-eye and right-eye viewpoints of the viewer based on the determined sight line direction, wherein the left-eye and right-eye viewpoints are determined based on tangent points where two tangents parallel to the sight line direction touch a circle with diameter equal to a distance between eyes of the viewer, and wherein the circle represents a circle virtually drawn along a plane parallel to a plane of a display screen; and
a disparity image generating section for:
selecting data of at least one of the source images, based on the determined left-eye viewpoint, as raw left-eye data;
selecting data of at least one of the source images, based on the determined right-eye viewpoint, as raw right-eye data;
outputting left-eye image data, based on the raw left-eye data; and
outputting right-eye image data, based on the raw right-eye data.

19. A non-transitory, computer-readable storage medium storing a set of instructions that, when executed by a processor, causes an apparatus to perform a method of processing source images having known viewpoints, the method comprising:
detecting a position of a viewer;
determining a sight line direction of the viewer based on the detected position;
determining left-eye and right-eye viewpoints of the viewer based on the determined sight line direction, wherein the left-eye and right-eye viewpoints are determined based on tangent points where two tangents parallel to the sight line direction touch a circle with diameter equal to a distance between eyes of the viewer, and wherein the circle represents a circle virtually drawn along a plane parallel to a plane of a display screen;
selecting data of at least one of the source images, based on the determined left-eye viewpoint, as raw left-eye data;
selecting data of at least one of the source images, based on the determined right-eye viewpoint, as raw right-eye data;
outputting left-eye image data, based on the raw left-eye data; and
outputting right-eye image data, based on the raw right-eye data.

* * * * *